United States Patent [19]

Donath

[11] Patent Number: 4,754,281
[45] Date of Patent: Jun. 28, 1988

[54] DIRECTION FINDER OPERATING ACCORDING TO THE WATSON-WATT PRINCIPLE

[75] Inventor: Bernhard Donath, Munich, Fed. Rep. of Germany

[73] Assignee: Wachtler GmbH, Hamburg, Fed. Rep. of Germany

[21] Appl. No.: 927,672

[22] PCT Filed: Jan. 27, 1986

[86] PCT No.: PCT/EP86/00033
§ 371 Date: Sep. 29, 1986
§ 102(e) Date: Sep. 29, 1986

[87] PCT Pub. No.: WO86/04426
PCT Pub. Date: Jul. 31, 1986

[30] Foreign Application Priority Data

Jan. 28, 1985 [DE] Fed. Rep. of Germany ....... 3502694

[51] Int. Cl.⁴ .............................. G01S 5/02; G01S 5/04
[52] U.S. Cl. .................................... 342/417; 342/432; 342/443; 342/444
[58] Field of Search ............... 342/417, 420, 432, 444, 342/443

[56] References Cited

U.S. PATENT DOCUMENTS 4,198,633  4/1980  Krajewski ........................... 342/437

FOREIGN PATENT DOCUMENTS 2617833  11/1977  Fed. Rep. of Germany ...... 342/417
2925723   1/1981  Fed. Rep. of Germany ...... 342/417

Primary Examiner—Theodore M. Blum
Assistant Examiner—Gregory C. Issing
Attorney, Agent, or Firm—James E. Nilles; Thomas F. Kirby

[57] ABSTRACT

In a direction finder operating according to the Watson-Watt principle and having two separate receivers (3, 4) of the same type and of simple construction for the signals of the two crossed directional antenna systems (A, B, C, D), the vectorial simulation signals VN in a transmission line for intermediate frequency antenna signals are compared to vectorial rectified signals VV in order to compensate the phase shift caused in both receivers by means of an adjustable phase shifter (21). The vectorial signals VV are selectively derived from the antenna signals as sum signals or difference signals. In one embodiment, a reconstructed phase signal is obtained by reverse pulse control in a direction finding ellipse generator (24, 25) having two outputs on the basis of the difference between the vectorial rectified signal VV and the rectified vectorial simulation signal VN. There is obtained such an amplitude synchronization that the ratio between the output signal amplitude of the receiver and the output amplitude of the control circuit is equal to the amplitude synchronization in each channel. According to the state of the phases, it is also possible to use the reverse value of the intermediate frequency antenna signal.

31 Claims, 4 Drawing Sheets

DIRECTION FINDER OPERATING ACCORDING TO THE WATSON-WATT PRINCIPLE

This invention relates to a direction finder operating according to the Watson-Watt principle, wherein the antenna signals of two crossed directional antenna systems, which are both additively and subtractively superimposed upon one another, are conducted to at least one additional single channel receiver and the thus-superimposed signals, after amplitude demodulation, are employed as internally produced vector signals for phase adjustment.

From West German Pat. No. 2,757,791 there is known a phase regulation with phase shifting present at the antenna side between the X and Y direction antenna signals with the help of a signal derived from the superimposed directional antenna signals. With this, however, there is not produced in the receiver itself any further phase shifting, since only a single receiver is employed to which the antenna signals of the two crossed directional antenna systems are conducted cyclically.

In taking the bearing of an electromagnetic wave with a Watson-Watt direction finder there are obtained for evaluation two bearing signals having amplitudes that are respectively proportional to the sine and to the cosine of the angle of incidence of the wave. On the screen of the cathode ray tube of such a direction finder there appears, as a direction display, a line inclined to the vertical at the angle of incidence, provided the sender from which direction is to be determined is ideally received.

However, when several waves with different angles of incidence and phase positions arrive simultaneously at the direction finding location, not just one line is formed but instead there is produced an elliptical display figure, the elliptical dispersion of which is determined by the phase differences arising at the antenna side from reflections arriving from different directions of the incident waves of the corresponding transmitters.

Also, phase differences between the two amplification channels of a double-channel direction finder operating according to the Watson-Watt principle are manifested as an elliptical dispersion of the direction lines, and they thus bring about directional errors.

There is known from West German published patent application No. 2,432,905 a direction finder operating according to the Watson-Watt principle with the employment of only one receiver to which the antenna voltages of two crossed directional antenna systems are cyclically conducted in time multiplex and the output signals from which are divided between individual processing channels according to their antenna correlations. By means of such a single channel direction finder receiver the direction display can be obtained with the information quality of a double or triple channel direction finder receiver.

The quality of single channel direction finder receivers of the present state of the art can be considered to be so high that differences in degree of amplification for any given value and phase, as between different receivers of the same type, are held within limits of interchangeability. From this there arises the possibility of employing, instead of a high quality double channel receiver, two like, simple single receivers to which the output signals of the directional antenna system are conducted.

For all that, however, it happens that the alternating antenna voltages to be measured undergo different phase displacements in passage through the individual receivers, so that the output voltages of the receivers produce an elliptical dispersion on the screen of the cathode ray tube.

For determination of the amplitude relationships of two alternating voltages conducted from the antenna system, while measuring their phase differences, it is known from West German published patent application No. 1,616,540 to sum the two voltages whereof the amplitude relationship is to be formed, or to subtract them from one another, and to conduct them, together with the sum or difference voltage, to a phase measurement device wherein two phase differences between the three conducted voltages are measured. From this reference it is also known to introduce an artificial phase rotation when phase angles to be measured are very small.

From West German published patent application No. 2,441,410 it is known, in a method for determining the incidence direction of space waves with the use of a stationary crossed coil antenna and a goniometer, to provide an addition link as well as a subtraction link to which the antenna voltages and a voltage obtained in each of the field coils are conducted simultaneously.

An amplitude detector that operates according to the mathematical principle $$r = \sqrt{x^2 + y^2}$$

is known from West German Pat. No. 2,346,879. With this a synthetic signal is produced, the magnitude of which corresponds to the largest possible received voltage of each of the two directional antennas, so that the output signal directly after a final control element is very accurately equal to the value of the voltage delivered from the directional antenna. By means of an electronic switch there are alternately fed to the inputs of a multiple channel direction finder the direction signal and in the correction stage an input signal with the gain of the previously existing direction signal. In this the phase differences of the antenna voltages of the antennas arranged in the N-S and E-W directions, in relation to the antenna voltages of an auxiliary antenna, are stored after passage through the direction finding channels themselves and, together with corrected amplitude values, the signal voltages conducted into the direction finding channel are set up as instructions for corrected phase values in relation to a reference channel.

The direction finder according to the invention is basically a development of the principle of West German Pat. No. 2,757,791 but employs two separate similar receivers of simple form, to which the two antenna signals of the two crossed directional antenna systems are constantly conducted.

The invention solves the problem, in a direction finder operating according to the Watson-Watt principle, of compensating the phase shift that arises in the receivers for the two antenna signals or of reconstructing the phase.

This problem is solved according to a first embodiment example in that a phase shifter is provided in one of the leads that conducts the intermediate frequency (IF), for compensation of the phase deviation between the two receivers and is adjustable according to comparison, in an analog comparator, of rectified vector simulation signals VN with the vector signals VV derived from the rectified antenna signals, and that the phase-shifted IF antenna signal of one directional antenna and the IF antenna signal of the other directional antenna, or its inverted value, is applied to the cathode ray tube and employed to form the vector simulation signal VN.

The employment of a phase shifter, which is in itself known in the state of the art, has the advantage of a comparatively small switching technology expenditure.

By means of the phase adjustment of the phase shifter in accordance with comparison of the rectified vector simulation signals VN obtained in a certain manner with the rectified vector signals VV there exists at the output of the phase shifter and at the one input of the cathode ray tube the phase corrected output signal of the one direction finder receiver.

According to a second embodiment example, a directional ellipse generator with two outputs is provided in a direction finder of the type described in the introduction, for reconstructing the phase between the two directional antenna signals, and its mutual phase relationships are adjustable in an analog comparator by comparison of a rectified vector simulation signal VN with the vector signal VV derived from the rectified antenna signals, so that the output signal of the direction ellipse generator and the associated rectified receiver output signal are each conducted to a control circuit for amplitude adjustment, the output signal of which is applied to the cathode ray tube and is utilized to form the vector simulation signal VN.

The amplitude adjustment is accomplished according to backward-acting phase adjustment of the direction ellipse generator in such a manner that the relationship of the amplitude of the receiver output signal to the amplitude at the output of the respective control circuits for amplitude adjustment is equal in each channel, which takes effect correspondingly at the input of the cathode ray tube.

In this, according to the embodiment example of FIG. 4, the vector simulation signal VN that is intended for comparison with the vector signal is formed in an advantageous manner from the difference between the output signal of the one control circuit for amplitude adjustment and the possibly inverted output signal of the other control circuit for amplitude adjustment and, after AM demodulation, is conducted to the analog comparator.

For the embodiment example of FIG. 3, on the other hand, the vector simulation signal VN is formed from the difference between the phase-shifted IF antenna signal at the output of the one receiver and the direct or inverted IF antenna signal at the output of the other receiver.

Both circuit variants have the advantage that the vector simulation signal VN is obtained from a difference, either by means of phase shifting or by means of phase reconstruction of phase corrected receiver output voltages. For phase adjustment of either the phase shifter or the direction ellipse generator there is then employed, as the case may be, the difference between the rectified vector signal derived from the original signal and the rectified vector simulation signal.

In further development of the invention, for compensation of phase departures and also for reconstruction of the phase of the antenna, signals of the two crossed directional antenna systems are either conducted as a sum signal to an additional single channel receiver and as a difference signal to a further single channel receiver or are additively and also subtractively superimposed upon one another and the resultant superimposition outputs are alternatively conducted by means of an electronic switch to only one additional single channel receiver.

In a modified development of the invention an analog computer can be provided that determines from the vector signal VV and the two demodulated output signals of the two receivers associated with the directional antennas the phase divergences that exist in the same, wherein this result, together with the demodulated receiver output signals, is conducted after analog/digital conversion, to a digital computer to which is connected a display device for the directional display.

In an advantageous development of the invention the computer can calculate the phase displacement from the previously given components and apply it to the X and Y display signals. An information relating to the phase shift can be obtained and evaluated inasmuch as the signals derived from the additively and subtractively superimposed directional antenna voltages are compared with one another with respect to their amplitude values and inasmuch as, depending on the resulting comparison product, an alternating voltage signal prepared for X and Y display is employed either directly or inverted for the display. It is sufficient to reverse the polarity, if required, of one of the alternating voltage signals employed for the X/Y display, but it is more correct, however, if, in the altering of the amplitude comparison result in consequence of a quadrant change, the polarity of the smaller of the alternating voltage signals provided for the X and Y display is reversed.

The resultant X/Y display is nevertheless ambiguous in relation to the direction finding direction. With the help of an intensity modulation signal which from time to time marks only one sense of the display figure, an unambiguous direction display can be prepared. For this it is immediately possible to obtain a correct sense assignment signal. A widely variable possibility for this exists in producing, instead of the additively and subtractively superimposed directional antenna voltages, two other superimposed antenna voltages which are formed by means of additive and subtractive superimposition of the voltage of a nondirectional antenna upon the then-larger directional antenna voltage, and comparing the signals related to these superimposed antenna voltages as to amplitude, along with which the comparison result thus obtained is stored in the form of a sense-relationship signal until the next sense determination.

These function sequences can be carried out on a short time basis, that is, in a magnitude of 500 msec, with the extensive employment of already existing apparatus instead of in a direction finder. The stored sense assignment signal then stands as instruction for the subsequent direction finding operation. The intensity modulation signal itself is obtained during the direction finding operation, in that there is formed from the alternating voltage signal prepared for the X and Y display a like-frequency square wave signal, the time position of which in relation to the then existing direction display has a defined direction relationship that is symmetrical to the main axis and wherein this square wave signal is employed, depending upon the stored sense assignment signal, directly or inverted as the sense direction intensity modulation of the direction display.

In the following, the exemplary embodiments of direction finders according to the invention are further explained in relation to the drawings, wherein.

Figures 1, 2:
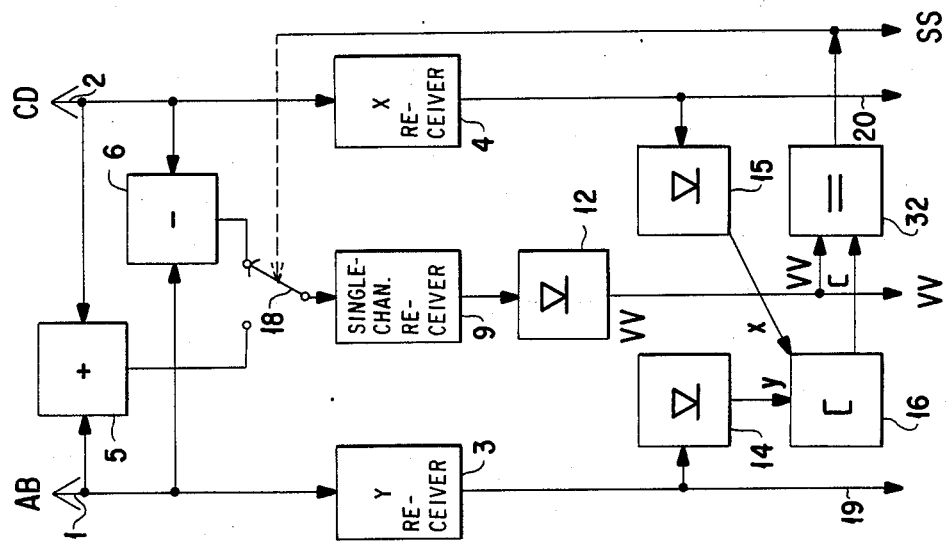
FIG. 1 is a block diagram of a direction finding apparatus up to the point of production of the IF antenna signals and the vector signals.
FIG. 2 is a block diagram of a modified direction finding apparatus up to the point of production of the IF signals and the vector signals.

Of the crossed directional antennas 1 and 2 designated in FIGS. 1 and 2 by AB and CD, the directional characteristic of the AB antenna 1 is developed in the N-S direction and is assigned to the Y ordinate, while the CD antenna 2 is arranged in the E-W direction and is assigned to the X ordinate. The antenna signals of each of the two directional antennas 1 and 2 are separately conducted, each to its direction finding receiver 3 and 4. The Y receiver 3 and the X receiver 4 are simple single channel direction finding receivers of possibly identical construction. The output signals of the two direction finding receivers appear in the conductors 19 and 20 as IF antenna signals. As a result it can happen that the received antenna voltages can obtain different phase shifts in passage through the two direction finding receivers.

The antenna signals of the two directional antennas 1 and 2 are further conducted to a summing stage 5 and to a subtraction stage 6, from which, in the FIG. 1 embodiment, the summing signal A+B is conducted to an additional single channel receiver 7 and the difference signal A−B is conducted to a further single channel receiver 8.

The vector signals at the outputs of these two single channel receivers 7, 8 pass through respective AM demodulators 10, 11 and, after demodulation, are compared with one another in an analog comparator 13. The criterion upon which an electronic switch 17 connected to the output of the analog comparator connects in the magnitude of the vector signal VV is the sign of the comparator output voltage. The prevailing switch condition is passed on in the circuit as a switching signal SS.

In the embodiment of FIG. 2 an electronic switch 18 is connected to the outputs of the summing stage 5 and the subtraction stage 6. Here, too, the criterion for passage of the magnitude of the vector signal is the sign of the output voltage of the sum or difference signal. This vector signal passed through by the electronic switch is conducted to an additional single channel receiver 9 and is present, after demodulation in an AM demodulator 12, as a vector signal VV that is to be further processed. The prevailing switching condition of the electronic switch 18 is in this case also passed on as a switching signal SS.

In the embodiment of FIG. 2 the output signal issuing from the Y direction finding receiver is conducted to an AM demodulator 14 and the output signal issuing from the X direction finding receiver is conducted to an AM demodulator 15, and the rectified output voltages y and x of these are fed to an operational amplifier 16 that forms, as an amplitude detector, the reference $$c = \sqrt{x^2 + y^2}$$

that is independent of the bearing direction. This reference signal c is compared with the rectified vector signal VV in an analog comparator 32. The comparator output voltage is impressed upon the conductor that conducts the switching signal SS.

Figure 3:
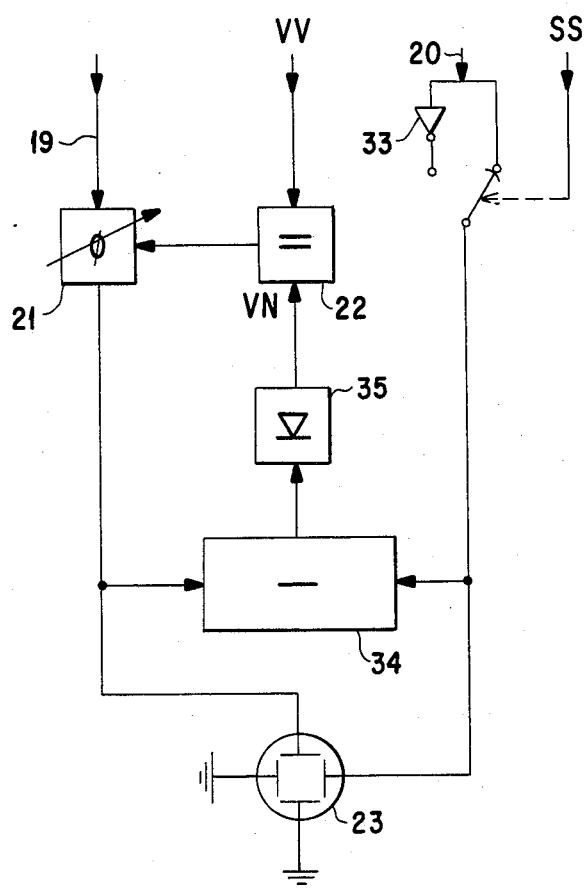
FIG. 3 is a block diagram of a switching circuit for further processing of the signals and display of the direction finding ellipse according to a first embodiment with phase shifting.
Figure 4:
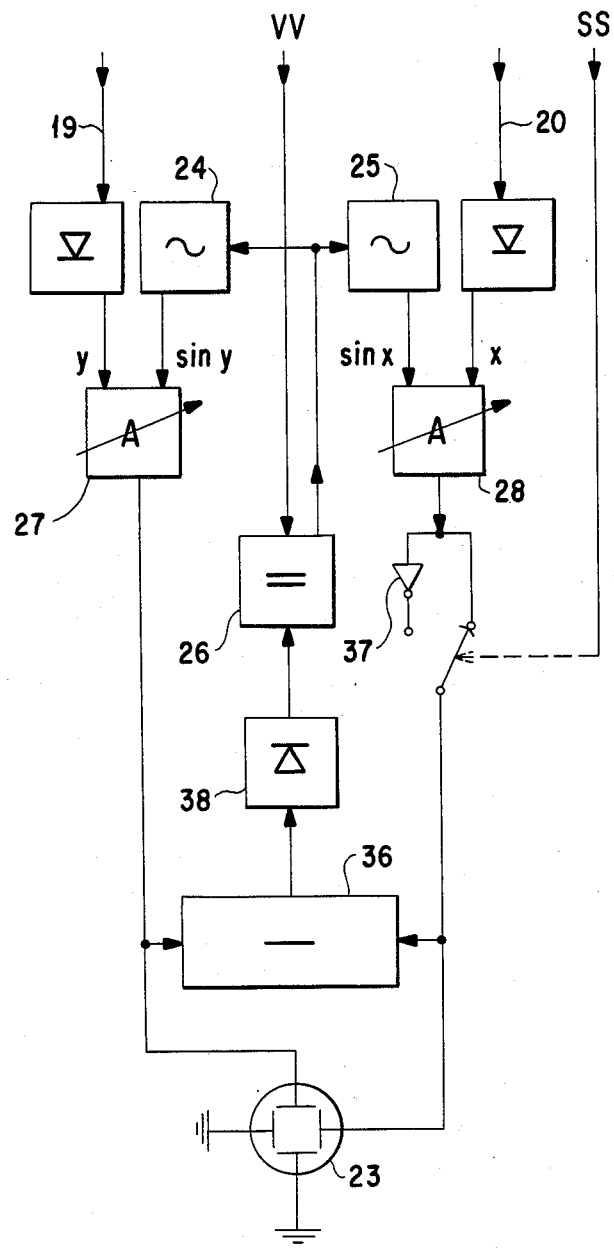
FIG. 4 is a block diagram of a switching circuit for further processing of the signals and display of the direction finding ellipse according to a second embodiment with phase adjustment by means of direction finding ellipse generators.
Figure 5:
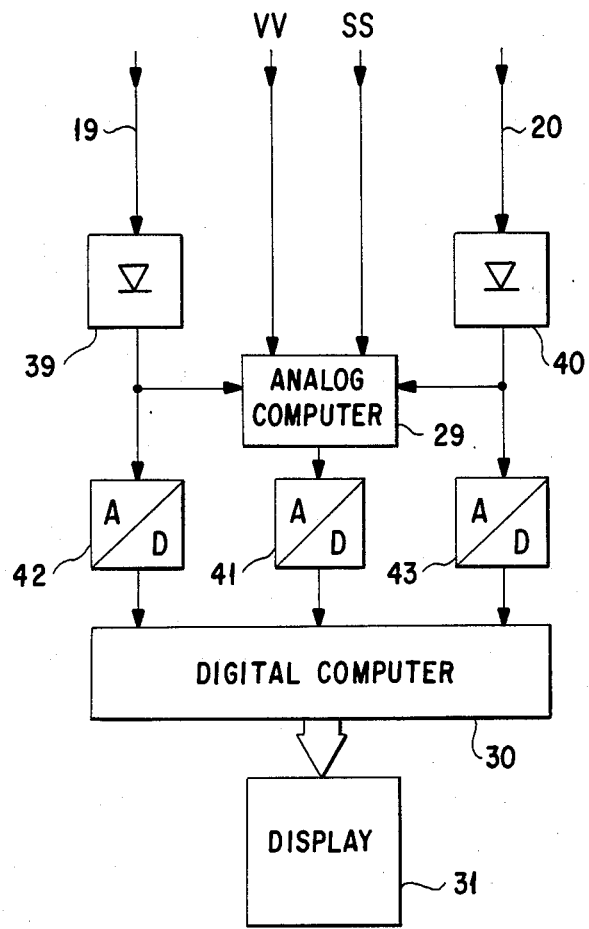
FIG. 5 is a block diagram of a switching circuit for further processing of the signals with the use of a computer and a display device for display of the direction finding ellipse.

The leads 19 and 20 that conduct the IF antenna signal and the leads that conduct the vector signal VV and the switching signal SS can be selectively connected to the circuits, as they are represented in FIGS. 3 to 5.

According to the variant embodiment of FIG. 3, a phase shifter 21 is provided for compensation of the phase divergence between the direction finding receivers 3 and 4 in the conductor 19 that carries the IF antenna signal of the AB antenna 1, and it is so adjusted as to its phase that rectified vector simulation signals VN are compared in an analog comparator 22 with the vector signals VV derived from the rectified antenna signals. For the forming of the vector simulation signals VN the phase-shifted IF antenna signal of the AB-direction antenna 1 and the IF antenna signal of the CB-direction antenna are drawn upon, just as these signals are applied to the cathode ray tube 23. According to the switching connection condition of the electronic switch 17 in FIG. 1 or of the electronic switch 18 in FIG. 2, and hence according to the magnitude of the switching signal SS, the inverted value of the IF antenna signal of the CB-direction antenna 2, inverted in an inverter 33, can also be utilized and applied for quadrant control to the x electrode of the cathode ray tube 23. The vector simulation signal VN intended for comparison with the vector signal VV is formed in a switch circuit 34 by difference formation between the phase shifted and the direct or inverted IF antenna signal and after demodulation in an AM demodulator 35 is conducted to the analog comparator 22. In the phase shifter 21 the phase adjustment is dealt with by comparison of the vector signals VV that are likewise conducted to it. At the output of the phase shifter and at the one input of the cathode ray tube there then exists the phase corrected output signal of the one direction finder receiver.

In the variant embodiment of FIG. 4 there is provided a direction finding ellipse generator 24, 25 with two outputs, constructed as a sine standard generator, for reconstruction of the phase between the two directional antenna signals. One part 24 of this generator delivers the value sin y and the other part 25 of the generator the value sin x. The phase adjustment of the direction finding ellipse generator is accomplished by means of backward regulation of a difference signal obtained in an analog comparator 26. To this end, the output signals of the direction finding ellipse generator 24, 25, together with the associated rectified receiver output signals y and x, respectively, are each fed to an amplitude adjustment control circuit 27, 28. By reason of the phase adjustment of the direction finding ellipse generator the output signals of the two amplitude adjustment control circuits 27, 28 have like phase and can be directly imposed upon the inputs of the cathode ray tube 23, where they reproduce the direction indicating display with reconstructed phase.

The backward regulation for the phase adjustment of the direction finding ellipse generator is accomplished in such a manner that the output signals of the two amplitude adjustment control circuits 27, 28 are drawn into use for forming the vector simulation signal VN by forming, in a subtraction link 36 to which the output signals of the two amplitude adjustment control circuits 27, 28 are fed, the difference between the output signal of the one control circuit 27 and the output signal of the other control circuit 28. If necessary, in accordance with the magnitude of the switching signal SS, the output signal of the control circuit 28 can be fed to the subtraction link 36 as inverted in an inverter 37. In both cases there is hereby obtained, at the output of the subtraction link 36, a vector simulation signal which, after passage through an AM demodulator 38, is fed to the analog comparator 26 as a rectified vector simulation signal VN and is compared with the rectified vector signal VV. The difference signal then serves for phase adjustment of the direction finding ellipse generator 24, 25.

In the variant embodiment of FIG. 5 there are fed into an analog computer 29 the output signals of the two direction finding receivers that are present in the leads 19, 20 as IF antenna signals after rectification in associated AM demodulators 39, 40, along with the vector signal VV and the switching signal SS. The analog computer 29 determines from the vector signal VV and the two demodulated output signals of the two receivers 3, 4 the phase divergence that exists after passage through the receivers 3, 4. The result of the determined phase divergence, and also the demodulated analog output signals y and x of the two receivers 3, 4, are each conducted to an analog/digital converter 41 or 42 and 43. The digitalized values from these three analog/digital converters 41–43 are read into a digital computer 30 to which is connected a display or readout device 31 for the direction display.

I claim:

1. Direction finder operating according to the Watson-Watt principle wherein antenna signals of the antennas (1, 2) of two crossed directional antenna systems (1, 2) which are conducted to a pair of single channel direction finding receivers (3,4), are further superimposed additively as well as substratively and conducted to at least one additional single channel receiver (7, 8) and the thus superimposed signals are employed after amplitude demodulation as internally produced vector signals (VV) for phase adjustment of the IF signals output on the two conductors (19,20) from the pair of single channel direction finding receivers, characterized in that, for compensating the phase divergence between the receivers (3, 4), a phase shifter (21) is provided in one of the conductors (19, 20) that carry the IF antenna signals and is adjustable by means of rectified vector simulation signals (VN) after their comparison with the vector signals (VV) derived from the rectified antenna signals in an analog comparator (22), and that the phase shifted IF antenna signals of one directional antenna and the IF antenna signal of the other directional antenna or the inverted value of the latter are applied to a cathode ray tube (23) and employed for forming of the vector simulation signals (VN).

2. Direction finder according to claim 1 characterized in that the antenna signals of the two crossed directional antenna systems (1, 2) are conducted as a sum signal to an additional single channel receiver (7) and as a difference signal to a further single channel receiver (8).

3. Direction finder according to claim 2, characterized in that the vector signals available at the outputs of the two single channel receivers (7, 8), after demodulation, are compared with one another in an analog comparator (13), and according to the sign of the output voltage of the comparator an electronic switch (17) is actuated in such a manner that the one of the two vector signals which is, at the time, the larger is selected for the further processing.

4. Direction finder according to claim 1, characterized in that the antenna signals of the two crossed directional antenna systems (1, 2) superimposed additively as well as subtractively are conducted alternatively by means of an electronic switch (18) to an additional single channel receiver (9).

5. Direction finder according to claim 4, characterized in that the electronic switch (18) is so actuated in accordance with the sign of the output voltage of the sum or difference signal that the one of the two vector signals which is, at the time, the larger is selected for the further processing.

6. Direction finder according to claim 4, characterized in that the reference signal intended for comparison with the vector signals is formed by means of the value $$c = \sqrt{x^2 + y^2},$$

wherein x and y signify the rectified signals available at the outputs of the two receivers (3, 4).

7. Direction finder according to claim 1, characterized in that the vector simulation signal (VN) intended for comparison is formed from the difference between the phase shifted IF antenna signal at the output of the one receiver (3) and the direct or inverted IF antenna signal at the output of the other receiver (4) and is conducted after AM demodulation to the analog comparator (22).

8. Direction finder according to claim 2, characterized in that an analogue computer (29) determines the phase divergence that exists in the two receivers (3, 4) from the vector signal (VV) and the two demodulated output signals from those receivers (3, 4), and that this result, together with the demodulated receiver output signals, is conducted after analog/digital conversion, to a digital computer (30) to which a display device for the direction finding display is connected.

9. Direction finder according to claim 8, characterized in that the signals derived from the additively and subtractively superimposed directional antenna voltages are compared with one another relative to their amplitude values for quadrant correlation at the display, and that depending upon the resulting comparison product an alternating voltage signal prepared for X and Y representation is employed either directly or inverted.

10. Direction finder according to claim 9, characterized in that with changing of the amplitude comparison result in consequence of a quadrant change the then-smaller of the alternating voltage signals provided for X and Y representation is inverted for the display.

11. Direction finder according to claim 2, characterized in that instead of the additively and subtractively superimposed directional antenna voltages two other superimposed antenna voltages are obtained which are formed by additive and subtractive superimposition of the voltage of a non-directional antenna with the then-larger directional antenna voltage, and that the signals corresponding to these superimposed antenna voltages are compared with one another as to amplitude, in connection with which the resulting comparison product in the form of a sense assignment signal is stored until the next sense determination.

12. Direction finder according to claim 11, characterized in that there is formed from the alternating voltage signals prepared for the X and Y representation a like-frequency square wave signal the time position of which has a defined direction correlation symmetrical to the main axis in relation to the then-existing direction finding display, and this square wave signal is employed directly or inverted, depending upon the stored sense assignment signal, for sense directed intensity modulation of the direction finding display.

13. Direction finder operating according to the Watson-Watt principle wherein the antenna signals of two crossed directional antenna systems (1, 2) which are conducted to a pair of single channel direction finding receivers (3,4), are further superimposed additively as well as substractively to at least one additional single channel receiver (7, 8) and the thus superimposed signals are employed after amplitude demodulation as internally produced vector signals, (VV) characterized in that a direction finding ellipse generator (24, 25) with two outputs is provided for reconstruction of the phase between the two directional antenna systems, the mutual phase condition of which outputs is adjustable by comparison in an analog comparator (26) of a rectified vector simulation signal (VN) with the vector signal (VV) derived from the rectified antenna signals, and the output signals of the direction finding ellipse generators (24, 25) combined with their associated rectified receiver output signals are conducted to respective amplitude regulation control circuits (27, 28), the output signals of which are applied to a cathode ray tube (23) and are drawn upon for forming the vector simulation signal (VN).

14. Direction finder according to claim 13, characterized in that the vector simulation signal (VN) intended for comparison with the vector signal is formed from the difference between the output signal of the one amplitude adjustment control circuit (27) and the possibly inverted output signal of the other amplitude adjustment control circuit (28) and, after AM demodulation, is conducted to the analog comparator (26).

15. A direction finder operating according to the Watson-Watt principle for locating the source of an incident electromagnetic wave comprising:
a crossed directional antenna system (AB, CD) comprising two antennas (1, 2), in each of which said wave induces an antenna signal;
a pair of single channel direction finding receivers (3, 4), one for each of said two antennas (1, 2) for receiving antenna signals from said two antennas (1, 2) and for providing IF antenna signals to two conductors (19, 20), which IF antenna signals from said pair of single channel direction finding receivers (3, 4) tend to exhibit phase divergence therebetween;
inverter measn (33, 37) selectively operable to invert the IF antenna signal in one of said two conductors (19, 20);
a display device (23) for receiving IF antenna signals from said two conductors (19, 20) and for providing a display indicative of the location of said source of said incident electromagnetic wave;
and phase adjustment means to detect phase divergence between said IF signals and to effect phase adjustment by compensating for the phase divergence between the IF antenna signals supplied to said display device (23), said phase adjustment means comprising:
vector signal means including a summing stage (5) and a subtracting stage (6) for receiving and superimposing said antenna signals from said two antennas (1, 2), additional single channel receiver means (7, 8, 9) for receiving superimposed signals from said stages (5, 6) and amplitude demodulator means (10, 11, 12) for receiving signals from said receiver means (7, 8, 9) to provide vector signals (VV) based on superimposed signals from a selected one of said stages (5, 6);
simulated vector signal means including difference forming means (34, 36) and amplitude demodulator means (35, 38) for receiving and comparing said IF antenna signals from said two conductors (19, 20) to provide simulated vector signals (VN);
means including comparator means (22, 26) for receiving and comparing said vector signals (VV) and said vector simulation signals (VN) to provide control signals based on the comparison;
and controllable phase shifter means (21, 27, 28, 24, 25) connected with said comparator means (22, 26) and with at least one of said two conductors (19, 20) for receiving said control signals and operable in response to said control signals to effect phase shifting of one of said IF signals relative to the other.

16. A direction finder according to claim 15 including analog comparator means (13, 32) for comparing vector signals (VV) from said additional single channel receiver means (7, 8, 9) after demodulation thereof by said amplitude demodulator means (10, 11, 12) and for providing an output voltage signal;
and electronic switching means (17, 18) operable to select for further processing by said comparator means (22, 26), according to the sign of said output voltage signal, that one of two vector signals available from said additional single channel receiver means (7, 8, 9) which is larger.

17. A direction finder according to claim 15 or 16 wherein said additional single channel receiver means (7, 8, 9) comprises only one single channel receiver (9) for receiving superimposed signals from either said summing stage (5) or said subtracting stage (6).

18. A direction finder according to claim 16 wherein said additional single channel receiver means (7, 8, 9) comprises only one single channel receiver (9);
and wherein said electronic switching means (17, 18) comprises a switch (18) for selectively connecting one of said summing stage (5) and said subtracting stage (6) to said one single channel receiver (9).

19. A direction finder according to claim 15 or 16 wherein said additional single channel receiver means (7, 8, 9) comprises two single channel receivers (7, 8), one for receiving superimposed signals from said summing stage (5) and the other for receiving superimposed signals from said subtracting stage (6).

20. A direction finder according to claim 16 wherein said additional single channel receiver means (7, 8, 9) comprises two single channel receivers (7, 8), one for receiving superimposed signals from said summing stage (5) and the other for receiving superimposed signals from said subtracting stage (6);

and wherein said electronic switching means (17, 18) comprises a switch (17) for seletively connecting one of said two amplitude demodulator means (10, 11) of the two single channel receivers (7, 8) to said comaprator means (22, 26).

21. A direction finder according to claim 16 wherein said electronic switch means (17, 18) also effects operation of said inverter means (33, 37).

22. A direction finder according to claim 15 or 16 wherein said controllable phase shifter means (21, 27, 28, 24, 25) comprises a phase shifter (21) connected with one (19) of said two conductors (19, 20) and with said comparator means (22, 26).

23. A direction finder according to claim 15 or 16 wherein said controllable phase shifter means (21, 27, 28, 24, 25) comprises two amplitude regulation control circuits (27, 28), each connected to a respective one of said two conductors (19, 20);

and a direction finding ellipse generator (24, 25) connected with said comparator means (26) and having two outputs, each of said outputs being connected to a respective one of said amplitude regulation control circuits (27, 28);

and being operable to reconstruct the phase relationship between antenna voltages induced in said two antennas (1, 2).

24. A direction finder according to claim 15 or 16, characterized in that the reference signal intended for comparison with the vector signals (VV) is formed by means of the value $$c = \sqrt{x^2 + y^2},$$

wherein x and y signify the rectified signals available at the outputs of said pair of single channel direction finding receivers (3, 4).

25. A direction finder according to claim 15 or 16, characterized in that the vector simulation signal (VN) intended for comparison is formed from the difference between the phase shifted IF antenna signal at the output of one single channel direction finding receiver (3) and the direct or inverted IF antenna signal at the output of the other single channel direction finding receiver (4) and is conducted after AM demodulation to said comparator means (22).

26. A direction finder according to claim 23, characterized in that the vector simulation signal (VN) intended for comparison with the vector signal (VV) is formed from the difference between the output signal of the one amplitude adjustment control circuit (27) and the possibly inverted output signal of the other amplitude adjustment control circuit (28) and, after AM demodulation, is conducted to said comparator means (26).

27. A direction finder according to claim 15 wherein said difference forming means takes the form of an analogue computer (29) which determines the phase divergence that exists in the IF signals from said two single channel direction finding receivers (3, 4) from the vector signal (VV) and from the two demodulated output signals from said two single channel direction finding receivers (3, 4), and that this result, together with the demodulated IF receiver output signals, is conducted after analog/digital conversion, to said controllable phase shifter means which takes the form of a digital computer (30) to which said display device (31) for the direction finding display is connected.

28. A direction finder according to claim 27, characterized in that the signals derived from the additively and substantially superimposed directional antenna voltages are compared with one another relative to their amplitude values for quadrant correlation at the display, and that, depending upon the resulting comparsion product, an alternating voltage signal prepared for X and Y representation is employed either directly or inverted.

29. A direction finder according to claim 28, characterized in that, with changing of the amplitude comparison result in consequence of a quadrant change, the then-smaller of the alternating voltage signals provided for X and Y representation is inverted for the display.

30. A direction finder according to claim 15, further comprising a non-directional antenna and characterized in that, instead of the additively and substractively superimposed directional antenna voltages, two other superimposed antenna voltages are obtained which are formed by additive and subtractive superimposition of the voltage of said non-directional antenna with the then-larger directional antenna voltage signal, and that the signals corresponding to these superimposed antenna voltages are compared with one another as to amplitude, in connection with which the resulting comparison product in the form of a sense assignment signal is stored until the next sense determination.

31. A direction finder according to claim 30 comprising means for forming from the alternating voltage signals prepared for the X and Y representation a like-frequency square wave signal, the time position of which has a defined direction correlation symmetrical to the main axis in relation to the then-existing direction finding display, and wherein said square wave signal is employed directly or inverted, depending upon the stored sense assignment signal, for sense directed intensity modulation of the direction finding display.

* * * * *